United States Patent
Lin et al.

(10) Patent No.: US 7,466,274 B2
(45) Date of Patent: Dec. 16, 2008

(54) MULTI-BAND ANTENNA

(75) Inventors: Ching-Chi Lin, Taipei Hsien (TW); Kai Shih, Taipei Hsien (TW); Yu-Yuan Wu, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/613,248

(22) Filed: Dec. 20, 2006

(65) Prior Publication Data

US 2008/0150829 A1    Jun. 26, 2008

(51) Int. Cl.
    H01Q 1/24    (2006.01)
    H01Q 1/38    (2006.01)
(52) U.S. Cl. .................................. 343/702; 343/700 MS
(58) Field of Classification Search .................. 343/702, 343/700 MS, 846
    See application file for complete search history.

(56) References Cited

U.S. PATENT DOCUMENTS

| | | | |
|---|---|---|---|
| 7,106,257 B2 * | 9/2006 | Liu et al. ............... | 343/700 MS |
| 7,119,747 B2 * | 10/2006 | Lin et al. .................... | 343/702 |
| 2003/0206136 A1 * | 11/2003 | Chen ........................ | 343/702 |
| 2007/0018892 A1 * | 1/2007 | Ku et al. ............... | 343/700 MS |
| 2007/0103367 A1 * | 5/2007 | Wang .................. | 343/700 MS |
| 2007/0109199 A1 * | 5/2007 | Hung et al. ........... | 343/700 MS |

* cited by examiner

Primary Examiner—Hoang V Nguyen
(74) Attorney, Agent, or Firm—WPAT, P.C.; Anthony King

(57) ABSTRACT

A multi-band antenna adapted to a portable electrical device capable of operating in various wireless communication bands includes a first radiating conductor having opposite elongated sides, a second radiating conductor extending from one end of the first radiating conductor, a third radiating conductor arranging about a central area of the first radiating. Both the second radiating conductor and the third radiating conductor extend from the same elongated side of the first radiating conductor. A feeding body is curved and extended from the third radiating conductor. According to a position that the feeding body connecting to the third radiating conductor and designed the feeding body, operation of the multi-band antenna has a preferred range of a low frequency bandwidth and a high frequency harmonic bandwidth.

19 Claims, 2 Drawing Sheets

MULTI-BAND ANTENNA

BACKGROUND OF THE INVENTION

1. Field of the Invention

The invention relates to a multi-band antenna, and particularly to a multi-band antenna which is adapted for configuring in portable electrical devices.

2. The Related Art

There is a growing need for multi-band antennas using in wireless communication devices to adapt the wireless communication devices for multi-band operation. Convention antennas operating in wireless communication include single band antennas, dual band antennas and three band antennas. It is necessary that an antenna adapting to the wireless communication device capable of operating in various wireless communication bands such as GSM850 (Global System for Mobile communications), EGSM (Extended Global System for Mobile communications), DCS1800 (Digital Cellular System), PCS1900 (Personal Conferencing Specification), W-CDMA2100 (Wideband Code Division Multiple Access), Wi-Fi (Wireless Fidelity) and etc.

SUMMARY OF THE INVENTION

An object of the present invention is to provide a multi-band antenna adapted for operating in various wireless communication bands.

According to the invention, the multi-band antenna includes a first radiating conductor having opposite elongated edges. A second radiating conductor extends from one end of the first radiating conductor. A third radiating conductor is arranged at a central area of the first radiating conductor. Wherein, the second radiating conductor and the third radiating extend from the same elongated edge of the first radiating conductor. A length of the first radiating conductor is longer than a length of the second radiating conductor. Further, a width of the third radiating conductor is larger than a width of the first radiating conductor. A feeding body having a feeding portion is arranged at the vicinity of a corner of the third radiating conductor closing the second radiating conductor.

While the multi-band antenna is operated at wireless communication, the multi-band antenna has a low frequency bandwidth and a high frequency harmonic bandwidth. According to the feeding body connecting to the corner of the third radiating conductor and designed the feeding body, the multi-band antenna has a preferred range of the low frequency bandwidth and the high frequency harmonic bandwidth. Therefore, the low frequency bandwidth of the multi-band antenna can include GSM850 and EGSM bands and the high frequency harmonic bandwidth of the multi-band antenna can include DCP1800, PCS1900, W-CDMA2100 and Wi-Fi bands.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
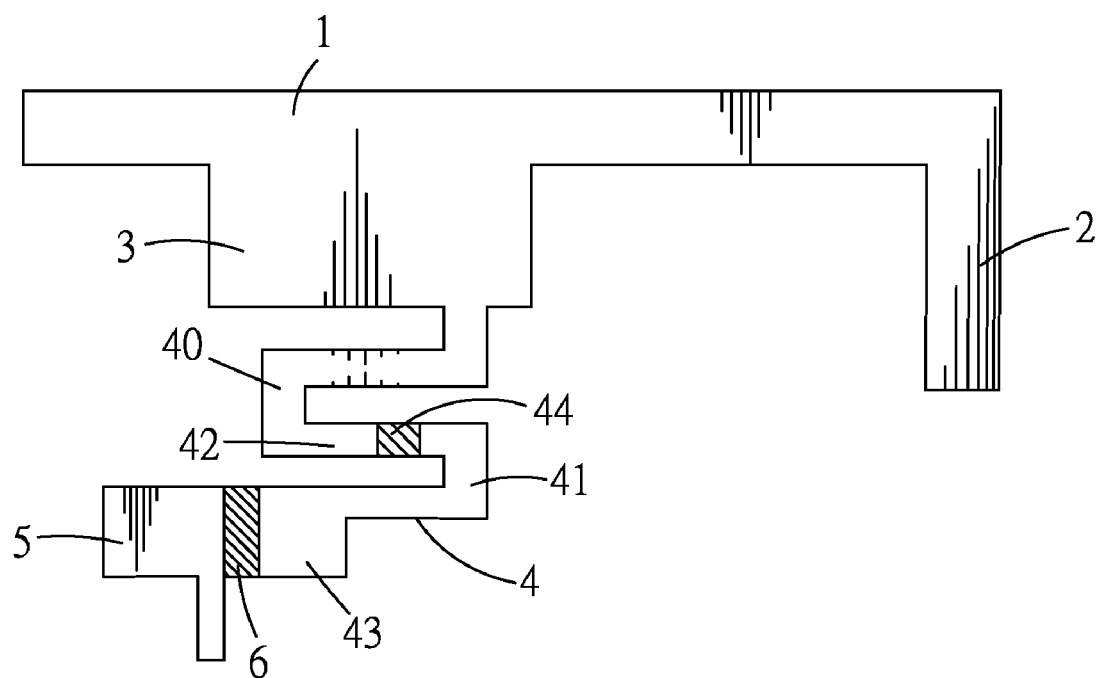
FIG. 1 shows the structure of a preferred embodiment of a multi-band antenna according to the present invention.

Please refer to FIG. 1, which shows the structure of a preferred embodiment of a multi-band antenna 100 according to the present invention. The multi-band antenna 100 is made of metallic substances for example, making from a metal foil, printing on a printed circuit board and etc.

The multi-band antenna 100 includes a first radiating conductor 1 defining opposite elongated edges and opposite ends. A second radiating conductor 2 perpendicular to the first radiating conductor 1 extends from one end of the first radiating conductor 1. In this case, a width of the first radiating conductor 1 is similar to a width of the second radiating conductor 2 and a length of the first radiating conductor 1 is longer than a length of the second radiating conductor 2.

A third radiating conductor 3 perpendicular to the first radiating conductor 1 is arranged at a central area of the first radiating 1. In this case, the third radiating conductor 3 is similar to a rectangle. The second radiating conductor 2 and the third radiating conductor 3 extend from same elongated edge of the first radiating conductor 1. A distance from the third radiating conductor 3 to the end of the first radiating conductor 1 where the second radiating conductor 2 extending from is longer than a distance from the third radiating conductor 3 to the other end of the first radiating conductor 1. A width of the third radiating conductor 3 is larger than the width of the first radiating conductor 1 and a length of the third radiating conductor 3 is shorter than the first radiating conductor 1.

Still referring to FIG. 1. A feeding body 4 is arranged at the vicinity of a corner closing the second radiating conductor 2. In this case, the feeding body 4 and the second radiating conductor 2 extend toward the same direction. The feeding body 4 has a first U-shape portion 40 and a second U-shape portion 41. Both the first U-shape portion 40 and the second U-shape portion 41 share a common side arm 42. The opening of the first U-shape 40 faces to the second radiating conductor 2. One end of the first U-shape portion 40 connects to the third radiating conductor 3. The opening of the second U-shape portion 41 faces opposite to the second radiating conductor 2. A feeding portion 43 extends from one end of the second U-shape portion 41. A first capacitor 44 is disposed on the common side arm 42 for connecting the first U-shape portion 40 and the second U-shape portion 41.

A grounding portion 5 is arranged about the feeding portion 43. A matching circuit 6 connects the feeding portion 43 and the grounding portion 5. In this case, the matching circuit 6 has an inductance and a second capacitor parallel connecting the inductance disposed between the feeding portion 43 and the grounding portion 5.

Figure 2:
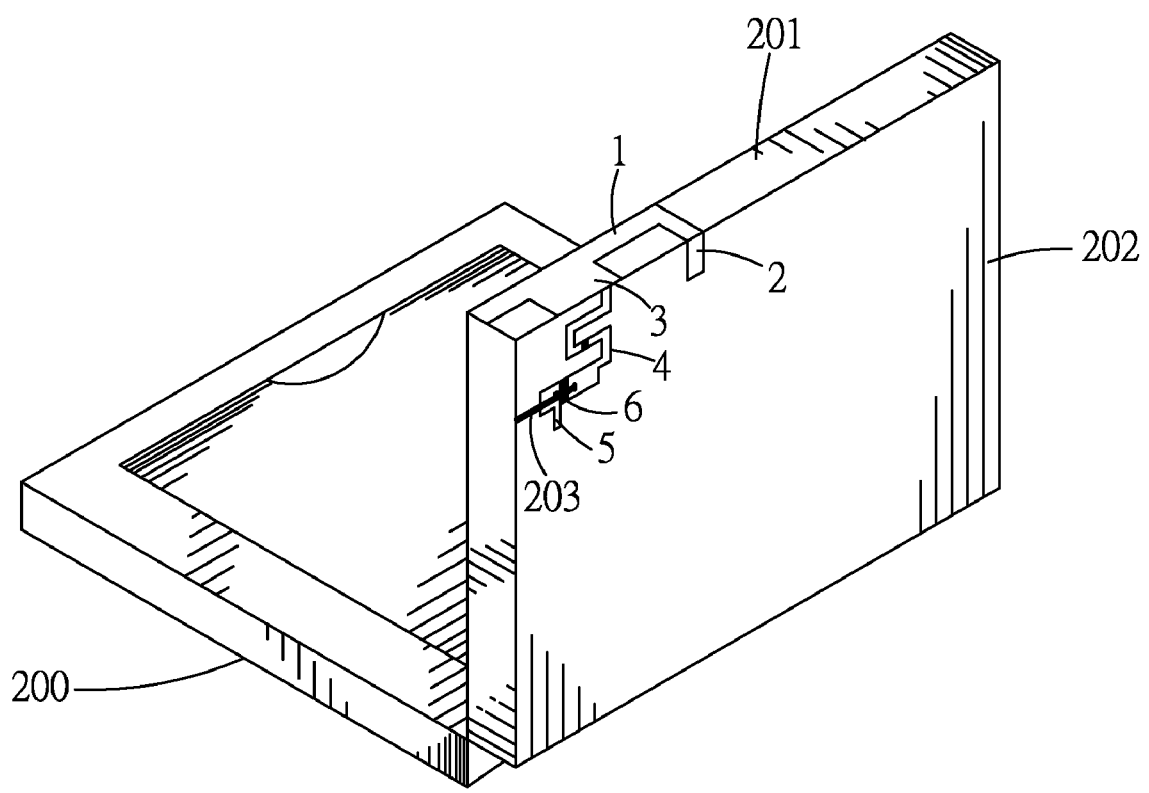
FIG. 2 illustrates the multi-band antenna configured in a notebook.

Referring to FIG. 2, the multi-band antenna 100 is adapted for configuring in portable electrical devices. In this case, the multi-band antenna 100 is configured in a laptop 200. The first radiating conductor 1, the second radiating conductor 2 and the third radiating conductor 3 are arranged at a top 201 of a display of the laptop 200. A free end portion of the second radiating conductor 2, the feeding body 4, the grounding portion 5 and the matching circuit 6 are arranged at a back surface 202 of the display of the laptop 200. In this case, the grounding portion 5 electronically couples with a ground of the laptop 200. Furthermore, the grounding portion 5 could be the ground of the laptop 200. The laptop 200 can operate the multi-band antenna 100 through a cable 203 connecting the feeding portion 43 of the multi-band antenna 100 and the grounding portion 5 for sending and receiving wireless signal.

While the multi-band antenna 100 is operated at wireless communication, the multi-band antenna 100 resonates a low frequency bandwidth and a high frequency harmonic bandwidth. A position of the feeding body 4 connecting the third radiating conductor 3 decides a range of the low frequency bandwidth and the high frequency harmonic bandwidth of the multi-band antenna 100. In this case, the feeding body 4 contacts about the corner of the third radiating conductor 3 closing the second radiating conductor 2. A length from the feeding body 4 connecting the third radiating conductor 3 to the free end of the first radiating conductor 1 substantially is a quarter of wavelength of the high frequency harmonic bandwidth. A length from the feeding body 4 connecting the third radiating conductor 3 to the free end of the second radiating conductor 2 substantially is a quarter of wavelength of the low frequency bandwidth. Therefore, the low frequency bandwidth of the multi-band antenna 100 can include GSM850 and EGSM bands and the high frequency harmonic bandwidth of the multi-band antenna 100 can include DCP1800, PCS1900, W-CDMA2100 and Wi-Fi bands.

Moreover, operation of the feeding body 4 balances horizontal polarization and vertical polarization of the multi-band antenna 100. Operation of the first U-shape 40 and the second U-shape 41 of the feeding body 4 enhances the low frequency bandwidth of the multi-band antenna 100 and operation of the capacitor 44 enhances the high frequency harmonic bandwidth of the multi-band antenna 100.

Furthermore, the present invention is not limited to the embodiments described above; various additions, alterations and the like may be made within the scope of the present invention by a person skilled in the art. For example, respective embodiments may be appropriately combined.

What is claimed is:

1. A multi-band antenna comprising:
    a first radiating conductor having elongated edges;
    a second radiating conductor extending from one end of said first radiating conductor, a length of said first radiating conductor longer than a length of said second radiating conductor;
    a third radiating conductor extending from the same elongated edge of said first radiating conductor where said second radiating conductor extending from, a width of said third radiating conductor larger than said width of said first radiating conductor, said length of said first radiating conductor longer than a length of said third radiating conductor; and
    a feeding body arranging at the vicinity of a corner of said third radiating conductor closing said second radiating conductor, wherein said feeding body has a first U-shape portion and a second U-shape portion, both said first and second U-shape portion share a common side arm, the opening of said first U-shape faces to said second radiating conductor and one end of said first U-shape portion connects to said third radiating conductor, the opening of said second U-shape portion faces opposite to said second radiating conductor, a feeding portion extends from one end of the second U-shape portion.

2. The multi-band antenna as claimed in claim 1, wherein said second radiating conductor is perpendicular to the first radiating conductor.

3. The multi-band antenna as claimed in claim 1, wherein said third radiating conductor perpendicular to the first radiating conductor is a rectangle.

4. The multi-band antenna as claimed in claim 1, further comprising a first capacitor arranged at said common side arm and connected said first U-shape portion and said second U-shape portion.

5. The multi-band antenna as claimed in claim 1, further comprising a grounding portion arranged about said feeding portion of said feeding body.

6. The multi-band antenna as claimed in claim 5, further comprising a matching circuit connecting said feeding portion of said feeding body and said grounding portion, which has a second capacitor and an inductance parallel connecting said second capacitor.

7. The multi-band antenna as claimed in claim 6, wherein said first radiating conductor, said second radiating conductor and said third radiating conductor are arranged at a top of a display of a laptop, a free end portion of said second radiating conductor, said feeding body, said grounding portion and said matching circuit are arranged at a back surface of said display of said laptop, said laptop operates said multi-band antenna through a cable connecting said feeding portion and said grounding portion.

8. A multi-band antenna which has a low frequency bandwidth and an up frequency bandwidth two to three times frequency upper than said low frequency bandwidth comprising:
    an elongated radiating conductor made substantially of metallic substances having a first end and a second end;
    a rectangle radiating conductor extending from an elongated edge of said elongated radiating conductor near said first end of said elongated radiating conductor; and
    a feeding body having a feeding portion extending from said rectangle radiating conductor, a length from said feeding body connecting said rectangle radiating conductor to said first end of said elongated radiating conductor substantially a quarter wavelength of said high frequency bandwidth, a length from said feeding body connecting said rectangle radiating conductor to said second end of said elongated radiating conductor substantially a quarter wavelength of said low frequency bandwidth.

9. The multi-band antenna as claimed in claim 8, wherein said feeding body extends from the vicinity of a corner of said rectangle radiating conductor near said first end of said elongated radiating conductor.

10. The multi-band antenna as claimed in claim 8, wherein said feeding body is curved to have a first opening and a second opening reverse to said first opening, one end of said feeding body connects said rectangle radiating conductor, said feeding portion extends from other end of said feeding body.

11. The multi-band antenna as claimed in claim 10, wherein said first opening near said rectangle radiating conductor faces to said second end of said elongated radiating conductor said end of said feeding body connecting said rectangle is near said first opening.

12. The multi-band antenna as claimed in claim 10, wherein said first opening and said second opening share a common side arm of said feeding body, a first capacitor is arranged at said common side arm 13. The multi-band antenna as claimed in claim 8, further comprising a grounding portion arranged about said feeding portion of said feeding body.

14. The multi-band antenna as claimed in claim 13, further comprising a matching circuit connecting said feeding portion of said feeding body and said grounding portion, which has a second capacitor and a inductance parallel connecting the second capacitor.

15. The multi-band antenna as claimed in claim 14, wherein said multi-band antenna is folded to configure in a portable electrical device, said elongated radiating conductor and said rectangle radiating conductor are located on same plane different to said feeding body, said grounding portion is a ground of said portable electrical device.

16. The multi-band antenna as claimed in claim 8, wherein said elongated radiating conductor has a first portion having said first end and a second portion having said second end perpendicular said first portion.

17. A multi-band antenna comprising:
a first radiating conductor having elongated edges;
a second radiating conductor extending from and perpendicular to one end of said first radiating conductor, a length of said first radiating conductor longer than a length of said second radiating conductor;
a third radiating conductor extending from the same elongated edge of said first radiating conductor where said second radiating conductor extending from, a width of said third radiating conductor larger than said width of said first radiating conductor, said length of said first radiating conductor longer than a length of said third radiating conductor;
a feeding body arranged at the vicinity of a corner of said third radiating conductor closing said second radiating conductor, said feeding body having a first U-shape portion and a second U-shape portion, both said first and second U-shape portion sharing a common side arm, the opening of said first U-shape facing to said second radiating conductor and one end of said first U-shape portion connecting said third radiating conductor, the opening of said second U-shape portion facing opposite to said second radiating conductor, a feeding portion extends from one end of the second U-shape portion;
a first capacitor arranged at said common side arm and connected said first U-shape portion and said second U-shape portion; and
a grounding portion arranged about said feeding portion of said feeding body.

18. The multi-band antenna as claimed in claim 17, further comprising a matching circuit connecting said feeding portion of said feeding body and said grounding portion, which has a second capacitor and an inductance parallel connecting said second capacitor.

19. The multi-band antenna as claimed in claim 17, wherein said multi-band antenna is folded to configure in a portable electrical device, said first radiating conductor, second radiating conductor and said third radiating conductor are located on same plane different to a free end portion of said second radiating conductor and said feeding body, said grounding portion electronically contacts a ground of said portable electrical device.

* * * * *